United States Patent
Choi et al.

(10) Patent No.: US 10,516,835 B2
(45) Date of Patent: *Dec. 24, 2019

(54) IMAGE APPARATUS AND METHOD FOR RECEIVING VIDEO SIGNAL IN MULTIPLE VIDEO MODES

(71) Applicant: SAMSUNG ELECTRONICS CO., LTD., Suwon-si (KR)

(72) Inventors: Young-bin Choi, Seoul (KR); Seung-jun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,168

(22) Filed: Sep. 21, 2018

(65) Prior Publication Data
US 2019/0028655 A1 Jan. 24, 2019

Related U.S. Application Data

(63) Continuation of application No. 14/561,758, filed on Dec. 5, 2014, now Pat. No. 10,116,881, which is a
(Continued)

(30) Foreign Application Priority Data

Oct. 31, 2007 (KR) .................. 10-2007-0110218

(51) Int. Cl.
*H04N 5/268* (2006.01)
*H04N 5/44* (2011.01)
(Continued)

(52) U.S. Cl.
CPC ............... *H04N 5/268* (2013.01); *H04N 5/44* (2013.01); *H04N 5/4403* (2013.01);
(Continued)

(58) Field of Classification Search
CPC ........ H04N 5/268; H04N 5/44; H04N 5/4403; H04N 21/436; H04N 21/4363; H04N 21/485; H04N 21/4408
(Continued)

(56) References Cited

U.S. PATENT DOCUMENTS 3,795,762 A 3/1974 Willis
5,018,013 A 5/1991 Rabii
(Continued)

FOREIGN PATENT DOCUMENTS

| JP | 5-115066 | 5/1993 |
| KR | 94-11435 U | 5/1994 |
| KR | 1020040076959 A | 9/2004 |

OTHER PUBLICATIONS

Communication dated Oct. 15, 2013 issued by the Korean Intellectual Property Office in counterpart Korean Patent Application No. 10-2007-0110218.

*Primary Examiner* — Michael Lee
(74) *Attorney, Agent, or Firm* — Sughrue Mion, PLLC

(57) ABSTRACT

An image apparatus and a method for receiving a video signal are provided. The image apparatus includes dedicated input terminals for receiving only particular video signals, and a common input terminal for receiving diverse video signals, and determines the format of video signals input through a corresponding input terminal and then displays the determined format on a screen. Accordingly, the number of input terminals can be reduced and the user can identify the format of the video signal input through the common input terminal.

20 Claims, 3 Drawing Sheets

Related U.S. Application Data continuation of application No. 13/846,305, filed on Mar. 18, 2013, now Pat. No. 8,928,817, which is a continuation of application No. 13/619,518, filed on Sep. 14, 2012, now Pat. No. 8,780,275, which is a continuation of application No. 12/261,668, filed on Oct. 30, 2008, now Pat. No. 8,284,321.

(51) Int. Cl.
*H04N 21/436* (2011.01)
*H04N 21/485* (2011.01)
*H04N 21/4363* (2011.01)

(52) U.S. Cl.
CPC ....... *H04N 21/436* (2013.01); *H04N 21/4363* (2013.01); *H04N 21/485* (2013.01); *H04N 2005/4408* (2013.01)

(58) Field of Classification Search
USPC .......................................................... 348/569
See application file for complete search history.

(56) References Cited

U.S. PATENT DOCUMENTS

| | | |
|---|---|---|
| 5,438,375 A | 8/1995 | Sasabe et al. |
| 5,898,463 A | 4/1999 | Nishiyama |
| 6,122,018 A | 9/2000 | Sugihara et al. |
| 6,226,053 B1 | 5/2001 | Cho |
| 6,515,707 B1 | 2/2003 | Lee |
| 7,209,184 B2 | 4/2007 | Byrne |
| 7,362,383 B2 | 4/2008 | Reneau et al. |
| 7,573,383 B2 | 8/2009 | Yun et al. |
| 8,284,321 B2 | 10/2012 | Choi |
| 8,780,275 B2 | 7/2014 | Choi |
| 8,928,817 B2 | 1/2015 | Choi |
| 2003/0043295 A1 | 3/2003 | Reneau et al. |
| 2004/0170380 A1 | 9/2004 | Byrne |
| 2006/0075437 A1 | 4/2006 | Bambic et al. |
| 2006/0110130 A1 | 5/2006 | Baek |
| 2006/0147185 A1* | 7/2006 | Erickson .................. H04N 5/76 386/210 |
| 2006/0221255 A1 | 10/2006 | Okubo |
| 2007/0153132 A1 | 7/2007 | Jong |
| 2007/0182443 A1 | 8/2007 | Funada |
| 2007/0216817 A1* | 9/2007 | Shen .................. H04N 5/46 348/705 |
| 2007/0268413 A1 | 11/2007 | King |
| 2008/0055470 A1* | 3/2008 | Garg .................. H04N 5/45 348/564 |
| 2008/0158422 A1 | 7/2008 | Chua et al. |
| 2009/0064258 A1 | 3/2009 | Mornhineway et al. |

\* cited by examiner

IMAGE APPARATUS AND METHOD FOR RECEIVING VIDEO SIGNAL IN MULTIPLE VIDEO MODES

CROSS-REFERENCE TO RELATED APPLICATIONS

This application is a continuation of application Ser. No. 14/561,758, filed Dec. 5, 2014, which is a continuation of U.S. application Ser. No. 13/846,305, filed Mar. 18, 2013, now U.S. Pat. No. 8,928,817, which is a continuation of U.S. application Ser. No. 13/619,518, filed Sep. 14, 2012, now U.S. Pat. No. 8,780,275, which is a continuation of U.S. application Ser. No. 12/261,668, filed Oct. 30, 2008, now U.S. Pat. No. 8,284,321, which claims priority under 35 U.S.C. § 119 from Korean Patent Application No. 10-2007-0110218, filed on Oct. 31, 2007, in the Korean Intellectual Property Office, the disclosures of which are incorporated herein by reference in their entireties.

BACKGROUND

1. Field of the Invention

Apparatuses and methods consistent with the present invention relate to an image apparatus and receiving a video signal, and more particularly, to providing an image apparatus which receives and processes a video signal and an audio signal provided from an external device, and then provides users with video and audio, and a method for receiving a video signal.

2. Description of the Related Art

Image apparatuses such as set-top boxes and televisions receive video signals from external devices such as video players and digital video disc (DVD) players as well as broadcast signals from broadcast stations, process the signals, and display images on a screen. Such image apparatuses include dedicated terminals for receiving component video signals, Separated Video (S-Video or Y/C) signals, and composite video signals, respectively. If a user connects an output terminal of an external device to a corresponding dedicated terminal, the user can acquire desired video and audio.

FIG. 1 is a schematic view illustrating an external signal input unit in a conventional image apparatus.

With reference to FIG. 1, the external signal input unit 10 in the conventional image apparatus includes a Composite Video Blanking and Sync (CVBS) input terminal 13 for receiving composite video signals; a Com-Y input terminal 16, a Pb input terminal 15, and a Pr input terminal 14 for receiving component video signals; a S-Video input terminal 17 for receiving S-Video signals; and audio input terminals 11 and 12.

The audio input terminals 11 and 12 are common input terminals for receiving audio signals corresponding to component video signals, S-Video signals, and composite video signals.

In FIG. 1, if a composite video signal provided from a video player is displayed on an image apparatus, the user connects the video player to the dedicated input terminal 13 for receiving composite video signals from among the diverse input terminals 13, 14, 15, 16, and 17 of the image apparatus via an RCA cable, i.e., a cable with an RCA plug. If the user wishes to display component video signals provided from a DVD player on the image apparatus, the user connects the DVD player to the dedicated input terminals 14, 15, and 16 to receive component video signals from among the diverse input terminals 13, 14, 15, 16, and 17 of the image apparatus via an RCA cable.

As described above, the same kind of RCA cable is used for composite video signals and component video signals, and the dedicated input terminals 13, 14, 15, and 16, which receive both types of video signals, have the same form. Therefore, there is a need for methods for using the dedicated input terminals having the same form as a common input terminal and thereby reducing the number of the input terminals on the image apparatus. Also, there is a need for methods for determining which format of a video signal is input to a common input terminal if a common input terminal is used instead of dedicated input terminals.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides an image apparatus which uses a common input terminal for receiving diverse video signals instead of dedicated input terminals for receiving particular video signals in order to reduce the number of input terminals, and a method for receiving video signals using the same.

Another aspect of the present invention provides an image apparatus which determines the format of video signals input through a dedicated input terminal and a common input terminal in order to prevent cross-over from occurring when a common input terminal is used, and a method for receiving video signals using the same.

According to an exemplary aspect of the present invention, there is provided an image apparatus which receives a video signal from an external device, the image apparatus includes an external signal input unit which comprises a plurality of dedicated input terminals, and a common input terminal, and a control unit which controls the image apparatus to be operated in a first video mode if a video signal is input through a first dedicated input terminal among the plurality of dedicated input terminals, and controls the image apparatus to be operated in a second video mode if a video signal is input through the common input terminal, and not through the plurality of dedicated input terminals.

The first dedicated input terminal may be an input terminal for receiving one of a Pb video signal and a Pr video signal constituting a component video signal.

The common input terminal may be an input terminal for receiving a Y video signal constituting a component video signal, and a composite video signal.

The control unit may control the image apparatus to be operated in a third video mode if a video signal is input through a second dedicated input terminal among the plurality of dedicated input terminals, and not through the first dedicated input terminal.

The second dedicated input terminal may be an input terminal for receiving an S-Video signal.

The image apparatus may receive a video signal also from a broadcast station.

The dedicated input terminals and the common input terminal may be connected to the external device through an RCA cable.

The control unit may be configured as a logic circuit which selects a single video signal from among video signals input through the plurality of dedicated input terminals and the common input terminal.

The control unit may control the image apparatus to select according to priority a single video signal from among video signals input through the plurality of dedicated input terminals and the common input terminal, and may be operated in a video mode corresponding to the selected video signal.

According to another exemplary aspect of the present invention, there is provided a method for receiving a video signal, the method including controlling an image apparatus to be operated in a first video mode if a video signal is input through a first dedicated input terminal among a plurality of dedicated input terminals, and controlling the image apparatus to be operated in a second video mode if a video signal is input through the common input terminal, and not through the plurality of dedicated input terminals.

The first dedicated input terminal may be an input terminal for receiving one of a Pb video signal and a Pr video signal constituting a component video signal.

The common input terminal may be an input terminal for receiving a Y video signal constituting a component video signal, and a composite video signal.

The method of claim 10 may further including controlling the image apparatus to be operated in a third video mode if a video signal is input through a second dedicated input terminal among the plurality of dedicated input terminals, and not through the first dedicated input terminal.

The second dedicated input terminal may be an input terminal for receiving an S-Video signal.

The image apparatus may receive a video signal also from a broadcast station.

The dedicated input terminals and the common input terminal may be connected to the external device through an RCA cable.

The image apparatus may select according to priority a single video signal from among video signals input through the plurality of dedicated input terminals and the common input terminal, and may be operated in a video mode corresponding to the selected video signal.

According to another exemplary aspect of the present invention, there is provided an image apparatus, including an external signal input unit which comprises input terminals for receiving a video signal of a first format, and an input terminal for receiving a video signal of a third format, wherein one of the input terminals for receiving the video signal of the first format is a common input terminal for receiving a video signal of a second format, and a control unit which selects according to priority one of the video signals of the first format, the second format, and the third format, and controls the image apparatus to be operated in a video mode corresponding to the selected video signal.

The video signals of the first format may be component video signals, the video signals of the second format may be composite video signals, and the video signals of the third format may be S-Video signals.

The control unit may give priority to the component video signal, the S-Video signal, and the composite video signal in order.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXAMPLE EMBODIMENTS

Figure 1:
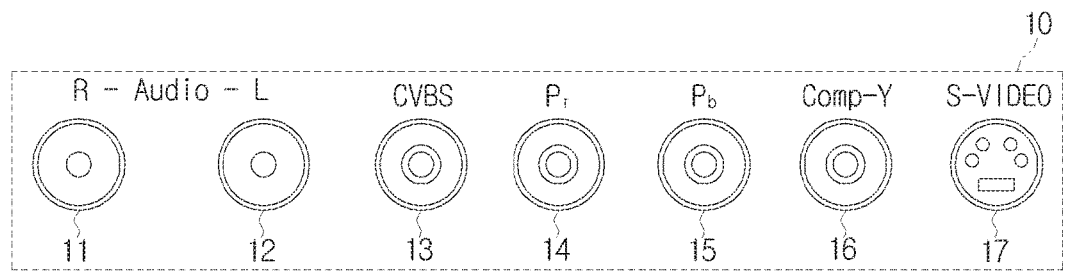
FIG. 1 is a schematic view illustrating an external signal input unit in a conventional image apparatus.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 2:
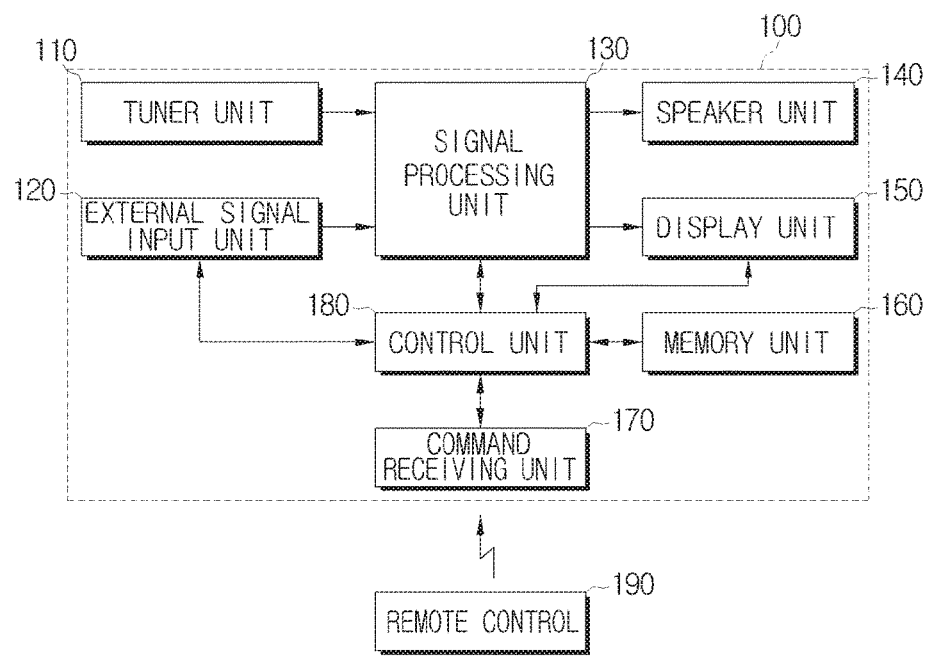
FIG. 2 is a schematic block diagram of an image apparatus according to an exemplary embodiment of the present invention.

FIG. 2 is a schematic block diagram of an image apparatus according to an exemplary embodiment of the present invention.

With reference to FIG. 2, the image apparatus 100 according to an exemplary embodiment of the present invention includes a tuner unit 110, an external signal input unit 120, a signal processing unit 130, a speaker unit 140, a display unit 150, a memory unit 160, a command receiving unit 170, and a control unit 180.

The tuner unit 110 tunes to broadcast signals at a frequency band corresponding to a control signal of the control unit 180 from among broadcast signals transmitted from a broadcast station (not shown), demodulates the tuned broadcast signals, and performs error correction.

The external signal input unit 120 includes a plurality of input terminals, through which the external signal input unit 120 receives component video signals, an S-Video signal, and a composite image signal from an external device, and also receives audio signals corresponding to each of the video signals. In an exemplary embodiment, the plurality of input terminals are jacks or female connectors. In another exemplary embodiment, the S-Video signal may be in the S-VHS format.

In an exemplary embodiment, the input terminals for receiving component video signals and the composite video signal are RCA jacks, i.e., RCA-type female connectors, and are connected to RCA plugs, i.e., RCA-type male connectors. The component video signals includes luma and two color difference video signals, e.g., Y, Pb, and Pr video signals, and requires 3 input terminals for receiving the respective video signals. A composite video signal may be input to the image apparatus 100 through the input terminal for receiving the Y video signal of the component video signals. Hereinafter, the component video signals may be collectively referred to as a video signal.

The signal processing unit 130 processes and outputs broadcast signals received through the tuner unit 110, and video signals and audio signals received through the external signal input unit 120, respectively. In greater detail, the signal processing unit 130 separates a video signal, an audio signal, and various additional data signal from the broadcast signal demodulated by the tuner unit 110.

Subsequently, the signal processing unit 130 processes the video signal separated from the broadcast signal or a video signal input through the external signal input unit 120 so that the video signals have a vertical frequency, resolution, and aspect ratio suitable for the output standard of the display unit 150. In addition, the signal processing unit 130 processes the audio signal separated from the broadcast signal or a audio signal input through the external signal input unit 120 so that the audio signals output are suitable for the output standard of the speaker unit 140.

The speaker unit 140 amplifies and outputs the audio signal output from the signal processing unit 130 at a predetermined volume.

The display unit 150 displays the video signal processed by the signal processing unit 130 on the screen, and can be implemented as diverse display modules, such as Digital Lighting Processing (DLP) projectors, Liquid Crystal Displays (LCD), or Plasma Display Panels (PDP).

The memory unit 160 stores a variety of programs and data which are needed to operate the image apparatus 100.

The command receiving unit 170 includes a plurality of keys (not shown) for inputting user commands, and a receiving unit for receiving user commands from a remote control 190. If the command receiving unit 170 receives user commands, the command receiving unit 170 transmits key signals corresponding to the user commands to the control unit 180.

The control unit 180, which may be implemented as a microcomputer or a central processing unit (CPU), operates the overall system to perform functions corresponding to key signals transmitted from the command receiving unit 170. In the present invention, the control unit 180 operates the signal processing unit 130 to process a video signal input through the input terminals formed on the external signal input unit 120. That is, the control unit 180 determines the format of the video signal input through the external signal input unit 120. If a video signal is input to the image apparatus 100, the control unit 180 controls the image apparatus 100 to be operated in a video mode corresponding to the format of the video signal. The operation of the control unit 180 will be described in greater detail below.

Figure 3:
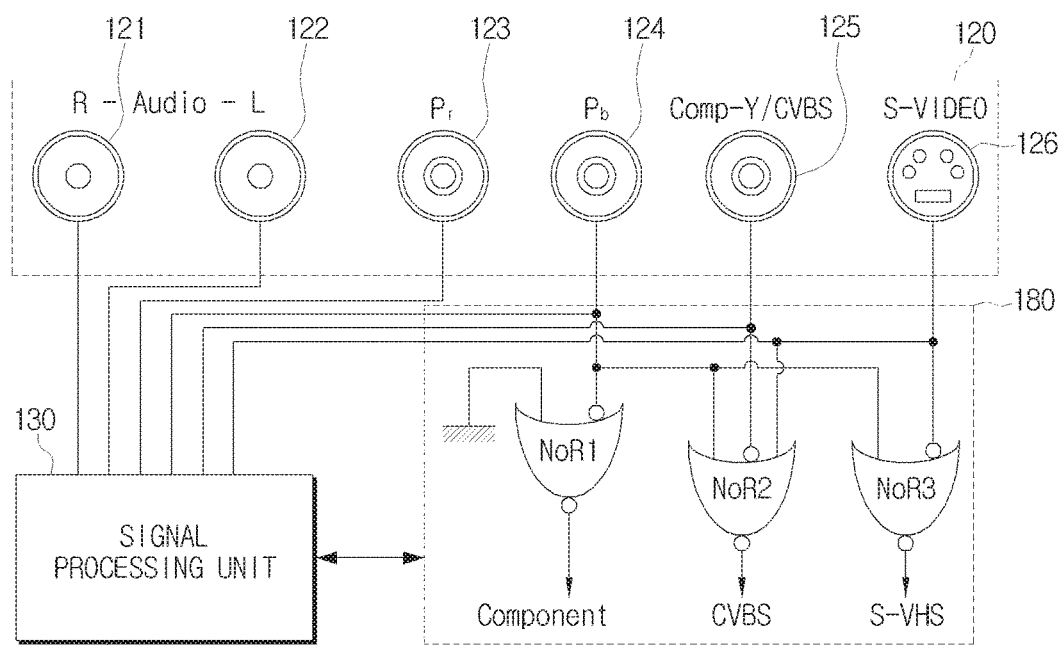
FIG. 3 is a schematic diagram of an external signal input unit and a control unit in an image apparatus according to an exemplary embodiment of the present invention.

FIG. 3 is a schematic diagram of the external signal input unit 120 and the control unit 180 in the image apparatus 100 according to an exemplary embodiment of the present invention.

With reference to FIG. 3, the external signal input unit 120 according to an exemplary embodiment of the present invention includes audio input terminals 121 and 122 for receiving right and left audio signals, input terminals 123, 124, and 125 for receiving a component video signal, and an input terminal 126 for receiving an S-Video signal. The input terminal 125 is a common input terminal, through which a composite video signal can also be input. The audio input terminals 121 and 122 are common input terminals for receiving audio signals corresponding to a component video signal, an S-Video signal, and composite video signals. In an exemplary embodiment, all or some of the input terminals 123, 124 and 125 are RCA jacks and the input terminal 126 may be a mini-DIN female connector. In another embodiment, there may be connectors other than RCA jacks and the present invention is not limited to using RCA-type connectors.

The control unit 180 determines image signals which are input through the dedicated input terminals 123 and 124 for receiving a Pr video signal and a Pb video signal constituting the component video signals, the common input terminal 125 for receiving a Y video signal further constituting the component video signals and a composite video signal, and the dedicated input terminal 126 for receiving an S-Video signal, and controls the image apparatus 100 to be operated in a video mode corresponding to the format of the input video signal.

With reference to FIG. 3, the control unit 180 includes three NOR gates. A first NOR gate NOR1 includes a grounded first input terminal which is not in use, and a second input terminal which is connected to the Pb input terminal 124. A second NOR gate NOR2 includes a first input terminal which is connected to the Pb input terminal 124, a second input terminal which is connected to the common input terminal 125, and a third input terminal which is connected to the S-Video input terminal 126. A third NOR gate NOR3 includes a first input terminal which is connected to the Pb input terminal 124, and a second input terminal which is connected to the S-Video input terminal 126.

As shown in FIG. 3, the control unit 180 may be configured as a logic circuit, so can be integrated into hardware, or may be designed as software and stored as a program. The control unit 180 may be operated in accordance with Table 1 below.

TABLE 1

| Pb input terminal | Common input terminal | S-Video input terminal | Video mode |
|---|---|---|---|
| ○ | ○ | ○ | component |
| ○ | ○ | X | component |
| ○ | X | ○ | component |
| ○ | X | X | component |
| X | ○ | ○ | S-Video |
| X | X | ○ | S-Video |
| X | ○ | X | CVBS |

In Table 1, O represents that a video signal is input, and X represents that a video signal is not input.

With reference to Table 1, regardless of whether a video signal is input through the common input terminal 125 or the S-Video input terminal 126, if a video signal is input through the Pb input terminal 124, the control unit 180 controls the image apparatus 100 to be operated in a component video mode. Regardless of whether a video signal is input through the common input terminal 125, if a video signal is not input through the Pb input terminal 124 but input through the S-Video input terminal 126, the control unit 180 controls the image apparatus 100 to be operated in a S-Video mode. If a video signal is not input through the Pb input terminal 124 and the S-Video input terminal 126, but input through the common input terminal 125, the control unit 180 controls the image apparatus 100 to be operated in a CVBS video mode.

That is, the control unit 180 gives priority to the Pb input terminal 124, the S-Video input terminal 126, and the common input terminal 125 in order, and then controls the image apparatus 100 to be operated in a video mode corresponding to the input video signal. In a component video mode, the control unit 180 operates the signal processing unit 130 to process component video signals input through the input terminals 123, 124, and 125. In an S-Video mode, the control unit 180 operates the signal processing unit 130 to process S-Video signals input through the input terminal 126. In a CVBS video mode, the control unit 180 operates the signal processing unit 130 to process a composite video signal input through the input terminal 125.

Figure 4:
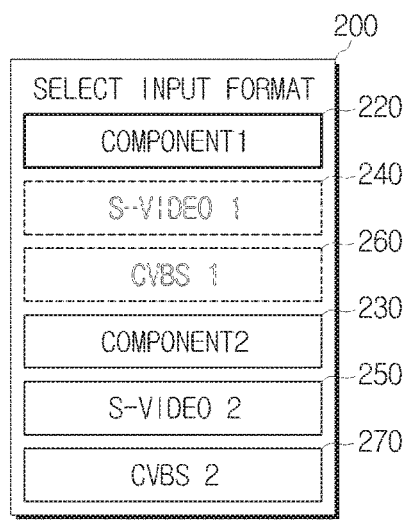
FIG. 4 shows an example of a menu displayed on an image apparatus according to an exemplary embodiment of the present invention.

FIG. 4 shows an example of a menu displayed in an image apparatus according to an exemplary embodiment of the present invention.

Among the video modes in the menu shown in FIG. 4, the COMPONENT1 220 represents a video mode corresponding to component video signals input through the component input terminals 123, 124, and 125, the S-VIDEO1 240 represents a video mode corresponding to an S-Video signal input through the S-Video input terminal 126, and the CVBS1 260 represents a video mode corresponding to a CVBS video signal input through the common input terminals 125. The COMPONENT2 230, S-VIDEO2 250, and CVBS2 270 represent video modes corresponding to the conventional dedicated input terminals 13, 14, 15, 16, and 17.

For example, as shown in FIG. 4, if a video signal is input through the Pb input terminal 124, the COMPONENT1 220 in the menu 200 is displayed in an active state, and the S-VIDEO1 240 and CVBS1 260 in the menu 200 are displayed in an inactive state so that the user cannot select the S-VIDEO1 240 and CVBS1 260. That is, the user can select one of COMPONENT1 220, COMPONENT2 230, S-VIDEO2 250, and CVBS2 270.

Figure 5:
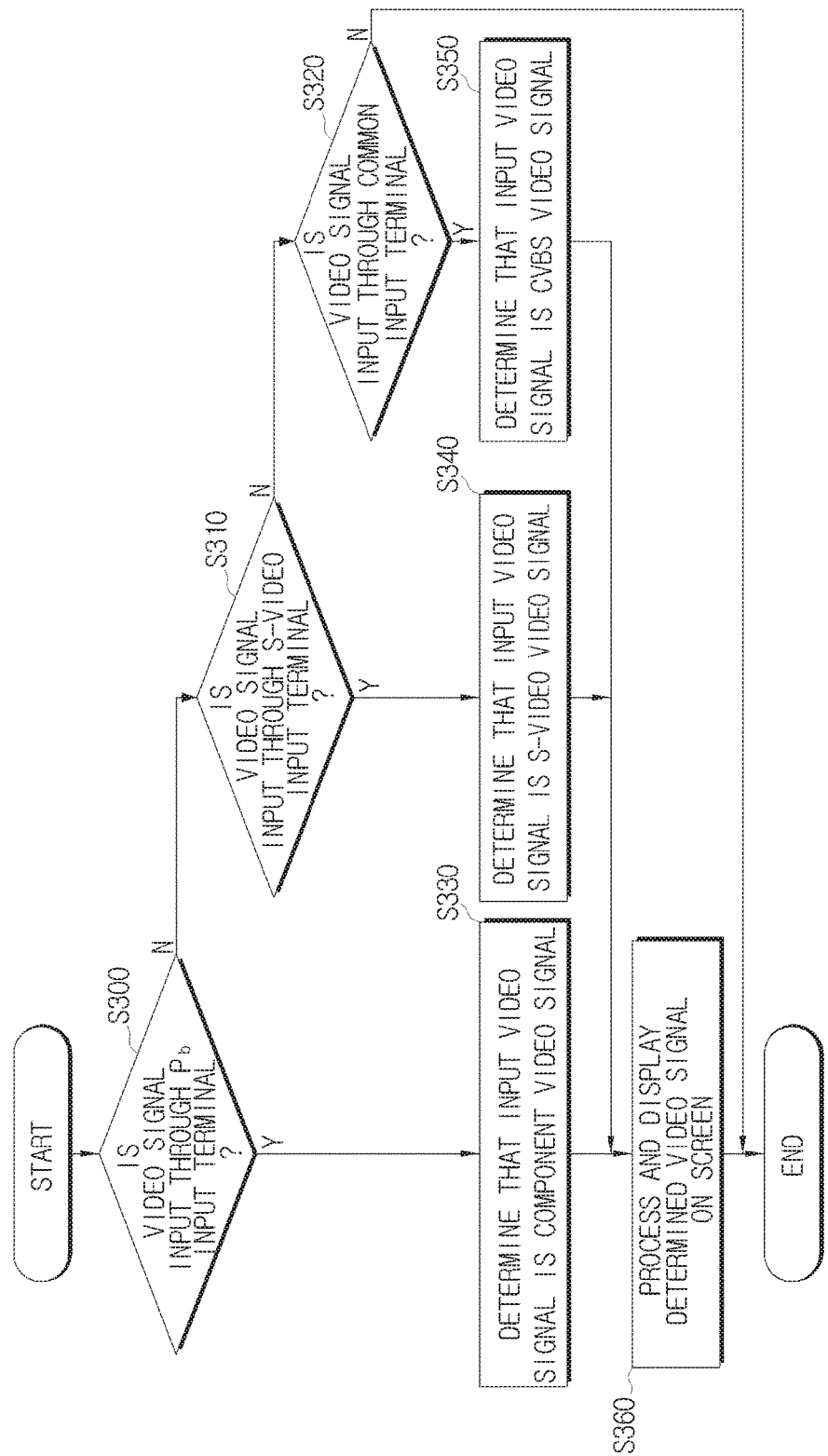
FIG. 5 is a flow chart illustrating the operation of an image apparatus according to an exemplary embodiment of the present invention.

FIG. 5 is a flow chart illustrating the operation of an image apparatus according to an exemplary embodiment of the present invention.

According to FIG. 5, the control unit 180 determines whether or not a video signal is input through the Pb input terminal 124 (S300). If it is determined that a video signal is input through the Pb input terminal 124 (S300-Y), the control unit 180 determines that the input video signal is a component video signal (S330). In operation S300, if it is determined that a video signal is not input through the Pb input terminal 124 (S300-N), the control unit 180 subsequently determines whether or not a video signal is input through the S-Video input terminal 126 (S310).

If it is determined that a video signal is input through the S-Video input terminal 126 (S310-Y), the control unit 180 determines that the input video signal is an S-Video signal (S340). In operation S310, if it is determined that a video signal is not input through the S-Video input terminal 126 (S310-N), the control unit 180 determines whether or not a video signal is input through the common input terminal 125 (S320).

If it is determined that a video signal is input through the common input terminal 125 (S320-Y), the control unit 180 determines that the input video signal is a CVBS video signal (S350). In operation S320, if it is determined that a video signal is not input through the common input terminal 125 (S320-N), the control unit 180 determines that no video signal is input to the image apparatus 100, and so finishes the operation.

The control unit 180 operates the signal processing unit 130 and the display unit 150 to process and display the determined video signal on the screen, respectively (S360).

Following the above process, the format of an input video signal is determined and displayed on the screen.

As can be appreciated from the above description, a common input terminal is used to receive diverse formats of video signals so that the number of input terminals mounted on an image apparatus can be reduced, and cross-over can be prevented by activating a video mode corresponding to a received video signal.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A video signal processing apparatus comprising:
   a video signal input unit including a plurality of video input terminals that includes a first video input terminal configured to receive a plurality of types of video signals and a second video input terminal configured to receive one type of video signals; and
   a processor configured to:
   determine whether a first video signal is received via the first video input terminal,
   determine whether a second video signal is received via the second video input terminal,
   in response to the second video signal being received via the second video input terminal while the first video signal is being received via the first video input terminal, process the first and second video signals received via the first video input terminal and the second video input terminal based on an automatically determined first video mode corresponding to a first type of the plurality of types of video signals, and
   in response to the second video signal not being received via the second video input terminal while the first video signal is being received via the first video input terminal, process the first video signal received via the first video input terminal based on an automatically determined second video mode corresponding to a second type of the plurality of types of video signals.

2. The video signal processing apparatus of claim 1, wherein the first video input terminal is a common video input terminal, and
   wherein the common video input terminal is used to receive at least two different types of video signals in order to reduce a number of video input terminals.

3. The video signal processing apparatus of claim 2, wherein a first shape of a first plug corresponding to one of the at least two different types of video signals, which is pluggable into the common video input terminal, is identical to a second shape of a second plug corresponding to another one of the at least two different types of video signals, which is pluggable into the common video input terminal.

4. The video signal processing apparatus of claim 1, wherein the plurality of video input terminals includes at least one common video input terminal and at least one non-common video input terminal, and
   wherein the at least one common video input terminal is used to receive a Y video signal when component video signals are input, and the same common video input terminal can be used to receive a composite video blanking and sync (CVBS) signal when a composite video signal is input.

5. The video signal processing apparatus of claim 4, wherein the at least one non-common video input terminal comprises a first dedicated video input terminal for receiving a Pb video signal of component video signals and a second dedicated video input terminal for receiving a Pr video signal of component video signals.

6. The video signal processing apparatus of claim 1, wherein the plurality of video input terminals includes a common video input terminal and at least one non-common video input terminal, and
    wherein a signal processing unit is operable in the automatically determined first video mode to process a third video signal received via the common video input terminal and the at least one non-common video input terminal and operable in the automatically determined second video mode to process a fourth video signal received via the common video input terminal and not through the at least one non-common video input terminal.

7. The video signal processing apparatus of claim 6, wherein the common video input terminal is provided with indications that either a first video connector transmitting a first type of video signals or a second video connector transmitting a second type of video signals can be plugged therein.

8. The video signal processing apparatus of claim 7, wherein names corresponding to the first video connector and the second video connector pluggable into the common video input terminal are provided on an exterior surface of the video signal processing apparatus.

9. The video signal processing apparatus of claim 8, wherein the first video connector comprises one of component video connectors and the second video connector comprises a composite video connector.

10. The video signal processing apparatus of claim 6, wherein the third video signal is a component video signal and the fourth video signal is a composite video signal,
    wherein a user interface displaying a menu listing a plurality of video input formats selectable such that at least one of a composite video signal format and a component video signal format is displayed in an inactive state based on a received input video signal.

11. The video signal processing apparatus of claim 6, wherein the at least one non-common video input terminal includes an input terminal for receiving one of two color difference signals of component video signals.

12. The video signal processing apparatus of claim 11, wherein, in the automatically determined first video mode, the common video input terminal functions as an input terminal for receiving a luma signal of the component video signals, and
    wherein, in the automatically determined second video mode, the common video input terminal functions as an input terminal for receiving a CVBS signal of a composite video signal.

13. A video processing apparatus comprising:
    a video signal input unit including a first video input terminal configured to receive a plurality of types of video signals and at least a second video input terminal configured to receive one type of video signals;
    a display; and
    a processor configured to:
        determine whether the first video input terminal is connected,
        determine whether the second video input terminal is connected,
        in response to the second video input terminal being connected while the first video input terminal is connected, control the display to display a menu screen providing a first indicator for a first video mode corresponding to a first type of the plurality of types of video signals in a first state and a second indicator for a second video mode corresponding to a second type of the plurality of types of video signals in a second state,
        in response to the second video input terminal being unconnected while the first video input terminal is connected, control the display to display the menu screen providing the first indicator for the first video mode in the second state and the second indicator for the second video mode in the first state, and
        process a video signal received via at least one of the first video input terminal and the second video input terminal in accordance with one of the first video mode and the second video mode selected according to a user input received via the menu screen.

14. The video processing apparatus of claim 13, wherein the first video mode is a component mode and the second video mode is a composite mode.

15. The video processing apparatus of claim 13, wherein the first state is an active state and the second state is an inactive state.

16. The video processing apparatus of claim 15, wherein a video mode displayed in the active state is selectable by a user and the video mode displayed in the inactive state is not selectable by the user.

17. An video processing apparatus comprising:
    a video signal input unit including a first video input terminal configured to receive a plurality of types of video signals and at least a second video input terminal configured to receive one type of video signals;
    a display; and
    a processor configured to:
        in response to the second video input terminal being determined to be connected while the first video input terminal is determined to be connected, control the display to display a menu screen including a first indicator for a first video mode corresponding to a first type of the plurality of types of video signals in a first state and a second indicator for a second video mode corresponding to a second type of the plurality of types of video signals in a second state;
        in response to the second video input terminal being determined to be unconnected while the first video input terminal is determined to be connected, control the display to display the menu screen including the first indicator for the first video mode in the second state and the second indicator for the second video mode in the first state; and
        process a video signal received via at least one of the first video input terminal and the second video input terminal in accordance with one of the first video mode and the second video mode selected according to a user command received via the menu screen.

18. The video processing apparatus of claim 17, wherein the first video mode is a component mode and the second video mode is a composite mode.

19. The video processing apparatus of claim 17, wherein the first state is an active state and the second state is an inactive state.

20. The video processing apparatus of claim 19, wherein a video mode displayed in the active state is selectable by a user and the video mode displayed in the inactive state is not selectable by the user.

* * * * *